(12) United States Patent
Sudolcan

(10) Patent No.: US 6,788,218 B2
(45) Date of Patent: Sep. 7, 2004

(54) PSEUDO REAL-TIME DIAGNOSTIC AND PROCESS MONITORING SYSTEM

(75) Inventor: David C. Sudolcan, Atascosa, TX (US)

(73) Assignee: Lancer Partnership, Ltd., San Antonio, TX (US)

( * ) Notice: Subject to any disclaimer, the term of this patent is extended or adjusted under 35 U.S.C. 154(b) by 397 days.

(21) Appl. No.: 09/908,229

(22) Filed: Jul. 19, 2001

(65) Prior Publication Data

US 2003/0016141 A1 Jan. 23, 2003

(51) Int. Cl.[7] .............................................. G08B 21/00
(52) U.S. Cl. ........................ 340/870.16; 340/825.15; 700/200; 700/223; 705/28
(58) Field of Search ................ 340/870.16, 825.15, 340/825.72; 702/185, 187; 700/4, 83; 705/1, 22, 28; 709/200, 223

(56) References Cited

U.S. PATENT DOCUMENTS

| | | | |
|---|---|---|---|
| 4,095,215 A | 6/1978 | Mortimer | 340/311 |
| 4,962,522 A | 10/1990 | Marian | 379/5 |
| 5,061,921 A | 10/1991 | Lesko et al. | 340/815.24 |
| 5,254,908 A | 10/1993 | Alt et al. | 315/312 |
| 5,304,991 A | 4/1994 | Motegi | 340/825.44 |
| 5,426,421 A * | 6/1995 | Gray | 709/223 |
| 5,461,570 A * | 10/1995 | Wang et al. | 700/110 |
| 5,588,038 A | 12/1996 | Snyder | 379/57 |
| 5,608,655 A | 3/1997 | Moughanni et al. | 364/514 |
| 5,623,256 A | 4/1997 | Marcoux | 340/825.69 |
| 5,640,153 A | 6/1997 | Hildebrand et al. | 340/825.06 |
| 5,661,468 A | 8/1997 | Marcoux | 340/825.44 |
| 5,757,643 A | 5/1998 | Kuroda et al. | 364/138 |
| 5,768,119 A * | 6/1998 | Havekost et al. | 700/4 |
| 5,798,707 A | 8/1998 | Camire | 340/825.44 |
| 5,884,144 A | 3/1999 | Chavez, Jr. et al. | 455/31.3 |
| 6,163,761 A * | 12/2000 | Kent | 702/187 |
| 6,289,299 B1 * | 9/2001 | Daniel et al. | 703/21 |
| 6,457,038 B1 * | 9/2002 | Defosse | 709/200 |
| 2002/0128932 A1 * | 9/2002 | Yung et al. | 705/27 |

* cited by examiner

Primary Examiner—Timothy Edwards
(74) Attorney, Agent, or Firm—Christopher L. Makay

(57) ABSTRACT

A method for monitoring a remotely located industrial process from a central service location generally comprises transmitting, through existing two-way digital paging networks, a monitoring instruction to the remote location, executing an operational command contained in the monitoring instruction on the industrial process, logging the effect of the execution of the command in a history file and transmitting content from the history file back to the central service location. The monitoring instruction may comprise the identification of an operational event for execution by the remotely located industrial process or be adapted for the on demand execution of one or more scripts of operational events. The content of the history files is transmitted, also through the existing two-way digital paging networks, back to the central service location where the data contained therein may be utilized to simulate the remotely operated industrial process according to date and time stamp information transmitted therewith as a computer generated animation of the remotely operated process.

15 Claims, 3 Drawing Sheets

PSEUDO REAL-TIME DIAGNOSTIC AND PROCESS MONITORING SYSTEM

FIELD OF THE INVENTION

The present invention relates to automated process monitoring and control. More particularly, the invention relates to a method and apparatus for utilizing an existing commercial two-way digital paging network for pseudo real-time monitoring, control and/or failure diagnosis of various automated processes such as, for example, ice bagging machines, fountain or citrus drink dispensers, water treatment systems and the like.

BACKGROUND OF THE INVENTION

Many industrial processes involve highly automated apparatus for the generation and/or dispensation of end product. For example, in the beverage service industry fully automated machinery is extensively relied upon for the production of massive quantities of ice. A typical ice machine is adapted to grow, harvest and bag ice and, thereafter, to stack the bagged ice with little or no human intervention. Such a complex machine is necessarily crowded with motors, levers, conveyors and other moving parts as well as fluid handling hoses, valves and nozzles—each highly prone to failure. Because a typical machine is generally continuously operated in an unattended mode, the failure of just one component may completely disrupt operation. Such a disruption could potentially result in the costly loss of many hours of production. As a result, automated production monitoring and remote failure mode analysis capabilities are of paramount importance for the reliably sustained production of end product.

One solution, as has been implemented by and is commercially available from the present Applicant, Lancer Corporation of San Antonio, Tex., involves real-time monitoring of the industrial process through the commercial telephone system. According to this implementation, a MODEM-to-MODEM dial up link is utilized to connect a remotely operated automated process with a service technician's computer located at a central service location. The technician's computer is provided with a software interface program that allows the service technician to generate operational commands, which are then executed on the remotely located automated process, and to receive and analyze a telemetry stream, which indicates the changing status of the various components of the remotely located automated process. The telemetry stream is stored in a database located on the service technician's computer and is used to analyze the operation of the remotely located automated process, either statistically or through an animation of the process located on the service technician's computer's monitor. Unfortunately, such an implementation requires a MODEM-to-MODEM link for every process to be monitored. On the central service location side, this necessitates at minimum a large MODEM bank as well as multiple phone line capabilities. On the remote process side, this implementation requires the provision of a MODEM and telephone line and most often requires modification of the remote location's inside cable plant every time the automated equipment is moved.

It is therefore an overriding object of the present invention to improve over the prior art by providing a method and apparatus for monitoring of remotely located automated process whereby the many sensors, switches and/or other indicators of the process may be monitored as necessary without requirement for dedicated, full-time communication with the central service location. It is a further object of the present invention to provide such a system whereby the service technician is also provided with the ability to efficiently perform repeated operations without resort to unnecessary duplication of effort. Finally, it is an object of the present invention to minimize the cost associated with the monitoring and diagnosis of remotely located automated processes without sacrifice of the service technician's ability to receive desired status data on an at will basis.

SUMMARY OF THE INVENTION

In accordance with the foregoing objects, the present invention—a method and apparatus for monitoring a remotely located industrial process from a central service location—generally comprises transmitting, through existing two-way digital paging networks, a monitoring instruction to the remote location, executing an operational command contained in the monitoring instruction on the industrial process, logging the effect of the execution of the command in a history file and transmitting content from the history file back to the central service location. Although in a minimal system, the monitoring instruction may simply comprise the identification of an operational event for execution by the remotely located industrial process, it is preferred that the system be adapted for the on demand execution of one or more scripts of operational events. In this preferred case, a special monitoring instruction may be utilized to transmit a new script to the remotely located process, where it can then be stored for execution as necessary in the continued monitoring and diagnosis of the industrial process.

The content of the history files is transmitted, also through the existing two-way digital paging networks, back to the central service location where the data contained therein may be utilized to simulate the remotely operated industrial process according to date and time stamp information transmitted therewith. In this implementation of the present invention, the simulation generally comprises the creation of an animated representation of the industrial process, giving the service technician much the same information as would an on site diagnostic examination of the industrial process. Because only a sampling of the actual system status is necessary to accurately recreate the operation of the remote system, the two-way digital paging network is found to be a robust medium for the efficient transmission of diagnostic commands and the system status resultant their respective execution.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Although those of ordinary skill in the art will readily recognize many alternative embodiments, especially in light of the illustrations provided herein, this detailed description is exemplary of the preferred embodiment of the present invention, the scope of which is limited only by the claims appended hereto.

Figure 1:
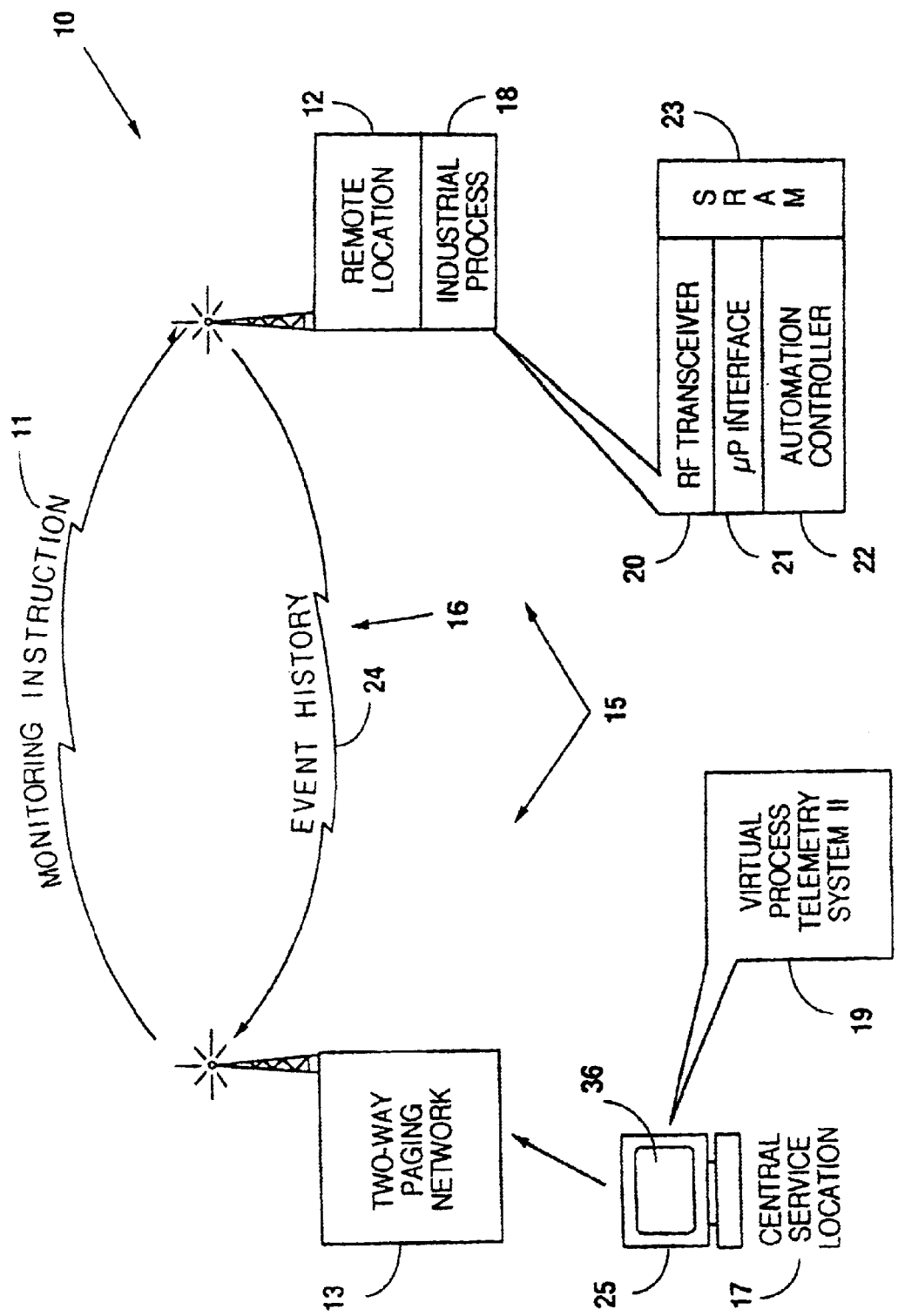
FIG. 1 shows, in schematic block diagram, the preferred implementation of the virtual process monitoring and telemetry system of the present invention.

Referring now to FIG. 1, the pseudo real-time diagnostic and process monitoring system 10 of the present invention is shown to generally comprise an interface 15 with a two-way communication channel 16 connecting a central service location 17 with a remotely located, automated industrial process 18. As shown in the Figure, this interface 15 generally comprises a virtual process telemetry software system 19 implemented at the central service location 17 for remote interface with the industrial process 18 as will be better understood herein. Likewise, the industrial process 18 is specially adapted for interface with the virtual process telemetry software system 19 through the two-way communication channel 16. In particular, such adaptation may comprise the provision of a radio frequency ("RF") transceiver 20, a microprocessor interface 21 to the industrial process' automation controller 22 and/or the provision of additional static random access memory ("SRAM") 23 for storage at the remote location 12 of monitoring instructions 11 from the central service location 17 and event history data 24 to be transmitted to the central service location 17. According to the preferred embodiment of the present invention, some of the additional SRAM 23 is also allocated to overhead processing associated with the process monitoring system 10. For example, additional memory is required in order to implement a serial communication interface compatible with the existing two-way digital paging network 13. In any case, those of ordinary skill in the art will readily recognize the many considerations necessary for implementation of the present invention, especially in light of the exemplary description herein.

In operation, the virtual process telemetry software system 19, preferably resident upon a standard desktop computer 25 at the central service location 17, is used to generate a monitoring instruction 11 for transmission through the two-way paging network 13, whereafter it may be executed upon the industrial process 18. As shown in FIG. 1, any presently implemented two-way digital paging network 13 may be utilized for transmission of the monitoring instruction 11 from the central service location 17 to the remote location 12. Once received at the remote location 12, the microprocessor interface 21 of the present invention communicates the monitoring instruction 11 from the RF transceiver 20 into non-volatile storage in the SRAM 23. As will be better understood further herein, the monitoring instruction 11 may then be executed upon the industrial process 18 via the process's automation controller 22. As also will be better understood further herein, the monitoring instruction 11 preferably also comprises an event logging component 26. This event logging component will generally dictate how diagnostic and process monitoring information is gathered at the industrial process 18 for transmission back through the two-way paging network 13 to the central service location 17. Once the gathered event history data 24 is transmitted from the remote location 12 to the central service location 17, the virtual process telemetry software system 19 is then utilized to animate the industrial process 18 for a service technician. As will be apparent from the exemplary description herein, this implementation allows the service technician to gather nearly as much information about the remotely located industrial process 18 as would be possible if he or she was to be operating the system on location 12.

Figure 2:
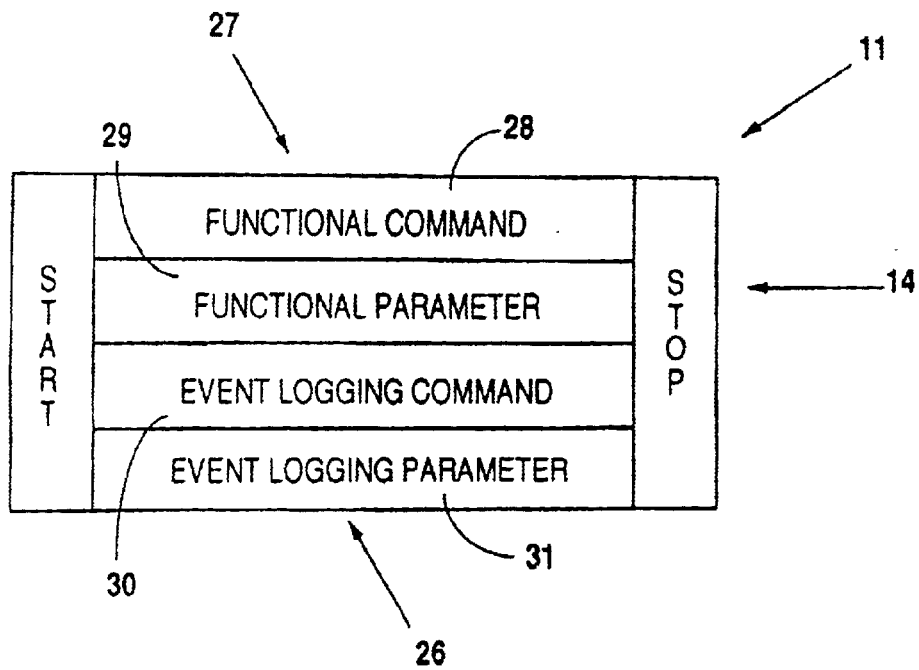
FIG. 2 shows the communication structure of a typical monitoring instruction for the system of FIG. 1.

As shown particularly in FIG. 2, the serially generated monitoring instruction 11 may generally be regarded as an operational command sequence 14 comprising a functional component 27 and an event logging component 26. The functional component 27 preferably comprises a functional command 28 as well as a functional parameter 29. Likewise, the event logging component 26 preferably comprises an event logging command 30 as well as an event logging parameter 31. In the most simple implementation, the functional command 28 may comprise an instruction recognized by the remotely located industrial process 18 as a command to perform some operation. In this case the functional parameter 29 would be the name or other identification for the operation or event to be performed. Similarly, the event logging command 30 may comprise an instruction recognized by the remotely located industrial process 18 as indicating that it should start or stop the gathering of event history data 32 at some time or that it should begin gathering event history data 32 immediately and stop gathering event history data 32 upon the occurrence of some event. In this case, the event logging parameter 31 may comprise the provision of either a time certain or the name or other identification of the operation or event intended to indicate the termination of history data logging.

Figure 3:
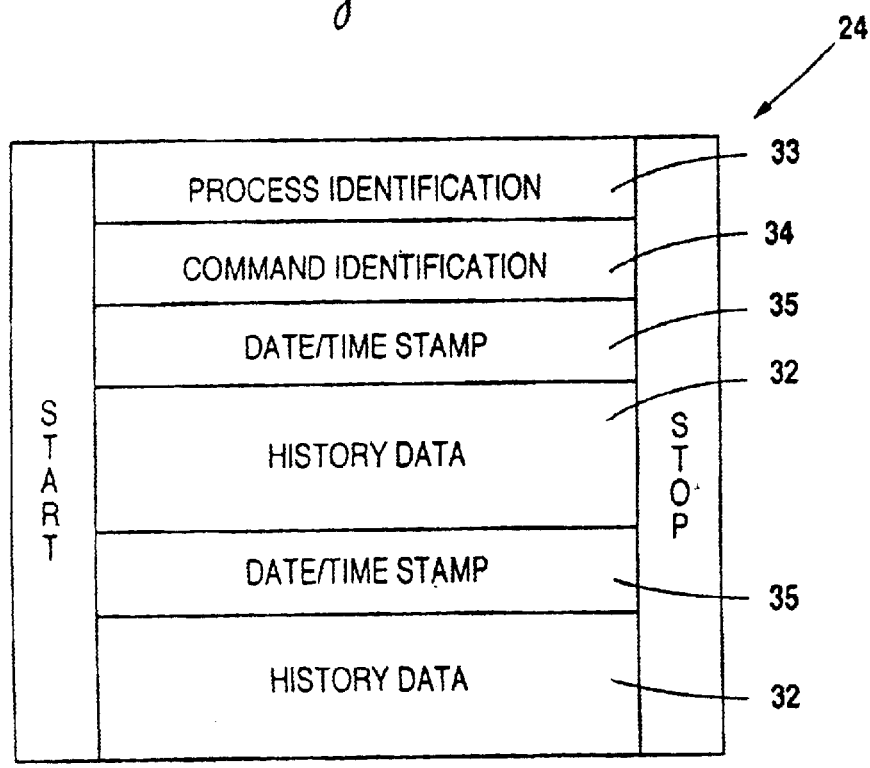
FIG. 3 shows the communication structure of a typical event history transmission for the system of FIG. 1.

As shown in FIG. 3, a typical event history transmission 24 may comprise a remote process identification component 33, a command identification component 34 and one or more history file components 32. The process identification component 33 preferably comprises a unique identifier for use by the virtual process telemetry software system 19 at the central service location 17 in determining the origin of the event history transmission 24. Likewise the command identification component 34 may be utilized by the virtual process telemetry software system 19 to determine what type of analysis is appropriate for event history data 32 to be transmitted in the remaining portion of the message 24. For example, if the command 14 that generated the event history transmission 24 was a request for the status of a particular set of valves implemented in the industrial process 18, the identification of that command 14 would eliminate the necessity for transmission of each valve's identification with the status information. In other words, the virtual process telemetry software system 19 would then be able to associate the status information with the valves of interest based solely upon the order of transmission of the status information 32. As also shown in FIG. 3, the history data component 32 of the transmission also preferably comprises a date and time stamp 35 indicating the time certain that the history data 32 was obtained. Such date and time information 35 may be utilized to animated the changing status of various systems implemented in the industrial process 18. Preferably, such an animation is implemented graphically at the technician's computer monitor 36 in order to realistically simulate the remotely located industrial process 18. In this manner, Applicant has found that diagnosis of system faults may be readily performed notwithstanding the technician's possible great physical distance away from the industrial process 18.

Figure 4:
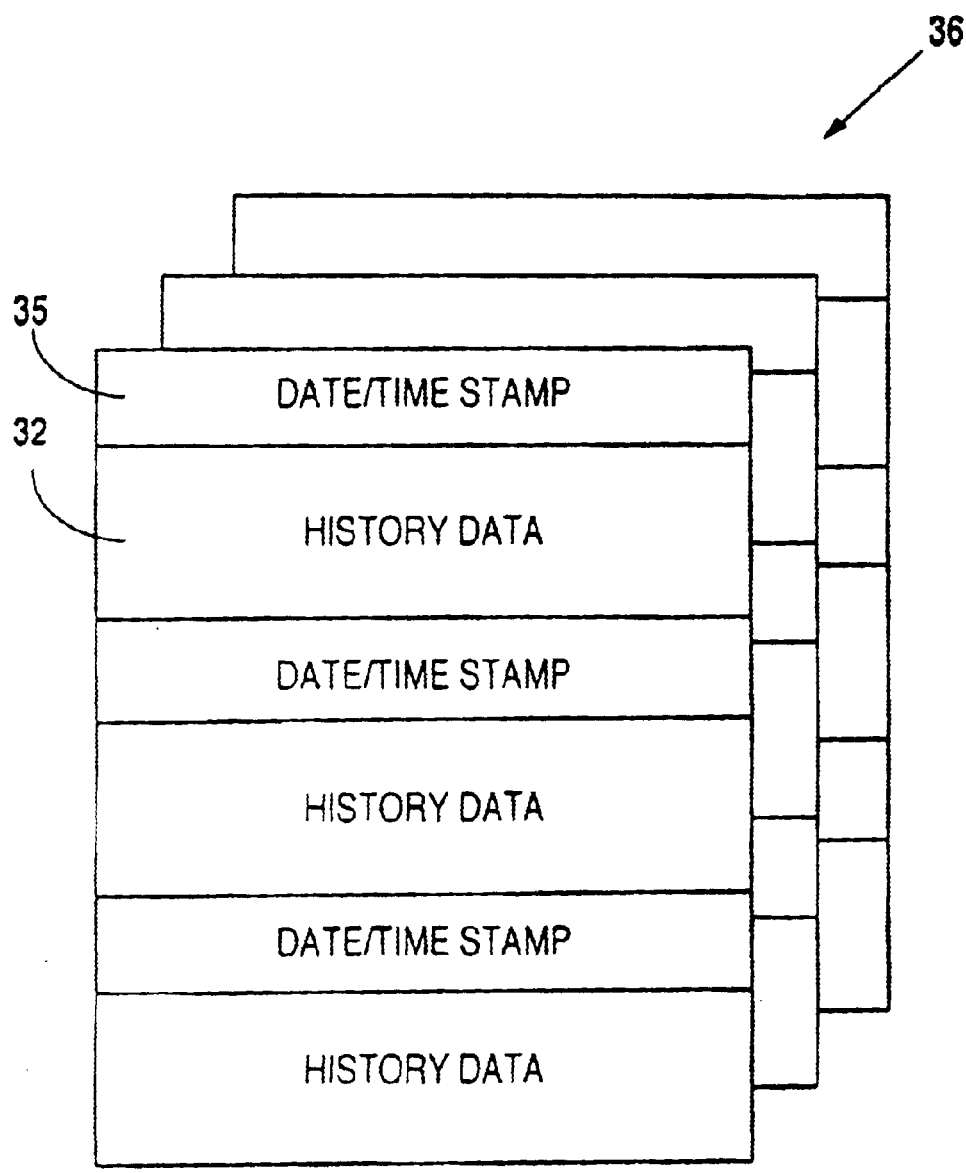
FIG. 4 shows a typical archived set of event history files for the system of FIG. 1.

Referring again to FIG. 2, it is noted that the functional command 28 may also comprise an instruction to perform a predeterminable script of events at the industrial process 18. In this case, the functional parameter 29 would be the name or other identification for the script to be performed. Upon the conduct of a script, it is likely that multiple event history transmissions 24 would be required in order to utilize the existing commercial two-way paging networks 13 for transmission of history data 32. For such an implementation, the present invention is preferably adapted to gather the multiple transmissions 24 within the virtual process telemetry software system 19, sort them according to date and time stamp information 35 and then animate them in whole or in part at the technician's computer 25. The data for such an animation may be stored as a multiple file set 36, as shown in FIG. 4, for immediate analysis or retrieval and analysis at a later time.

In at least one implementation of the present invention, a special monitoring instruction 11 may be generated for the provision of a new script to be stored in the SRAM 23 of the remotely located industrial process 18. In this case the functional command 28 may be an indication to the microprocessor interface 21 that it is to accept a new script and to store it for later use in the SRAM 23. The functional parameter 29 would then be the name or other identification that is to be used for the new script. The event logging component portion 26 of the operational command 14 for this special monitoring instruction 11 would then be substituted out in favor of a list of names or other identifications for various operations or events to be conducted of the industrial process upon execution of the new script. In this manner, the pseudo real-time diagnostic and process monitoring system 10 of the present invention is made extremely robust even within the message size limitations of the existing commercial two-way digital paging networks 13. For example, once a service technician identifies that a certain remotely located industrial process 18 often suffers same malfunctions, he or she can prepare a script designed to confirm this malfunction and transmit it to the industrial process 18 for storage and recall as necessary. According to this implementation, a simple monitoring instruction 11 to invoke the script is then efficiently followed by a data transmission 24 comprising sufficient information to confirm or rule out the recurring malfunction.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, the event logging command 30 and parameter 31 may be adapted to allow the service technician to specify the logging resolution. In this manner, more or less data 32 may be gathered for transmission back through the paging network 13 depending upon the rate of change of the monitored systems of the industrial process 18. Likewise, a special monitoring instruction 11 may be devised to allow the service technician the ability to remotely set performance adjustment switches for the remote industrial process 18 or to send flash updates for system firmware. These and many other extensions of the present invention will be readily apparent, however, to those of ordinary skill in the art upon having had the opportunity to review the exemplary embodiments described herein. In any case, because the scope of the present invention is much broader than any particular embodiment, the foregoing detailed description should not be construed as a limitation of the scope of the present invention, which is limited only by the claims appended hereto.

What is claimed is:

1. A method for monitoring a remotely located industrial process from a central service location, said process monitoring method comprising the steps of:
    transmitting a monitoring instruction to said remote location utilizing a digital paging network, said monitoring instruction comprising an operational command comprising a script identification component adapted to initiate an event script for said industrial process;
    executing said operational command on said industrial process;
    logging the effect of the execution of said command in a history file comprising time stamped records; and
    transmitting content from said history file to said central service location, wherein said content transmitted from said history file to said central location comprises a plurality of time-stamped records; and
    animating the effect of the execution of said command at said central service location.

2. The process monitoring method as recited in claim 1, wherein said event script is selectable from a plurality of event scripts, each said event script comprising a list of ordinary events for said industrial process.

3. The process monitoring method as recited in claim 1, wherein said animating step comprises the step of sequencing content from a plurality of history files, said sequencing step being based upon the time stamp associated with each said record thereof.

4. The process monitoring method as recited in claim 1, wherein said transmitting content from said history file step comprises utilizing a two-way digital paging network.

5. The process monitoring method as recited in claim 1, wherein said event script comprises a list of ordinary events for said industrial process.

6. The process monitoring method as recited in claim 5, said process monitoring method further comprising the step of prepositioning said list with said industrial process at said remote location.

7. The process monitoring method as recited in claim 6, wherein said prepositioning step comprises transmitting said list to said remote location as a special monitoring instruction.

8. The process monitoring method as recited in claim 1, wherein said operational command comprises a functional component, said functional component being adapted to initiate an ordinary event for said industrial process.

9. The process monitoring method as recited in claim 8, wherein said operational command further comprises an event logging component, said event logging component being adapted to effect said logging step.

10. The process monitoring method as recited in claim 9, wherein said event logging component is adapted to cause initiation of said logging step.

11. The process monitoring method as recited in claim 9, wherein said event logging component is adapted to determine the resolution of said logging step.

12. The process monitoring method as recited in claim 9, wherein said event logging component is adapted to cause termination of said logging step.

13. The process monitoring method as recited in claim 12, wherein said adaptation of said event logging component to cause termination of said logging step comprises the identification of an event and the completion of said event indicating the time for termination of said logging step.

14. The process monitoring method as recited in claim 12, wherein said adaptation of said event logging component to cause termination of said logging step comprises the provision of an absolute time, said absolute time being the desired time for termination of said logging step.

15. The process monitoring method as recited in claim 12, wherein said adaptation of said event logging component to cause termination of said logging step comprises the provision of a time period, said time period being the desired duration of said logging step.

* * * * *